Figure 2:
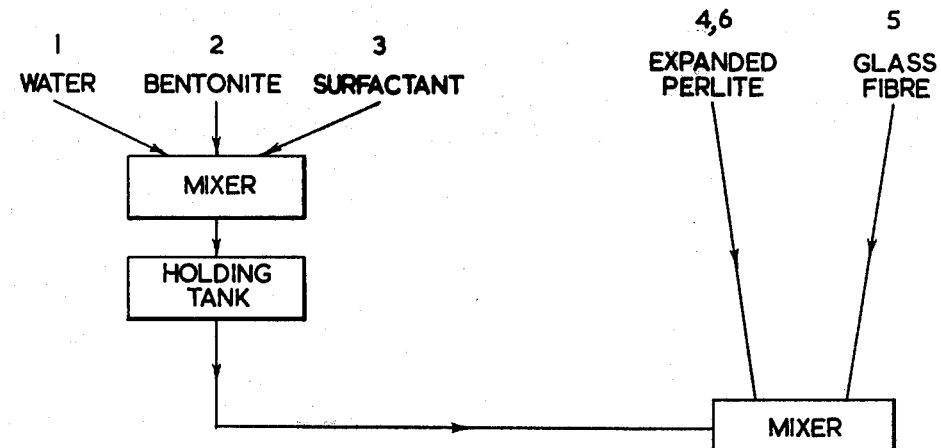

United States Patent [19]

Erskine

[11] 4,248,810

[45] Feb. 3, 1981

[54] FOAMED INSULATING MATERIALS AND METHOD OF MANUFACTURE

[75] Inventor: Clive A. Erskine, Forestville, Australia

[73] Assignee: ACI Technical Centre Pty Ltd., Australia

[21] Appl. No.: 971,320

[22] Filed: Dec. 20, 1978

Related U.S. Application Data

[63] Continuation of Ser. No. 778,666, Mar. 17, 1977, abandoned, which is a continuation-in-part of Ser. No. 657,954, Feb. 13, 1976, abandoned.

[51] Int. Cl.$^3$ .............................................. C04B 33/14
[52] U.S. Cl. .................................. 264/43; 106/40 R; 264/45.3; 264/60
[58] Field of Search ................ 264/43, 45.3, DIG. 49, 264/60; 106/40 R

[56] References Cited

U.S. PATENT DOCUMENTS

| | | | |
|---|---|---|---|
| 3,203,813 | 8/1965 | Gajardo | 106/40 R |
| 3,287,476 | 11/1966 | Snyder | 264/60 |
| 3,341,339 | 9/1967 | Stein | 264/43 |
| 3,418,403 | 12/1968 | Garnero | 264/43 |
| 3,689,611 | 9/1972 | Hardy | 264/43 |

Primary Examiner—John A. Parrish
Attorney, Agent, or Firm—Pennie & Edmonds

[57] ABSTRACT

A method of producing high temperature insulating foam is described. A gellable foam of glass fibre, expanded perlite and bentonite in water is shaped dried and fired at a temperature below the temperature at which a ceramic product is formed but in excess of the temperature at which the bentonite lattice hydroxyl water is lost.

13 Claims, 2 Drawing Figures

FOAMED INSULATING MATERIALS AND METHOD OF MANUFACTURE

CROSS REFERENCE TO RELATED APPLICATIONS

This application is a continuation of application Ser. No. 778,666 filed Mar. 17, 1977, abandoned; said application Ser. No. 778,666 is a continuation-in-part of my application Ser. No. 657,954 filed Feb. 13, 1976, now abandoned.

This invention relates to methods for the production of high temperature insulating materials and products produced thereby.

High temperature insulating materials are used in areas where operating hot face temperatures are greater than 350° C. and normally less than 1000° C. Materials used within this range include calcium silicate, felted textile glass fibre, mineral fibre and ceramic fibre. Calcium silicate has a particular advantage where a rigid, self-supporting material is required, while the fibrous types are preferred where flexibility is required. Normally, no single material effectively covers the whole high temperature range, either because of economic considerations or because of degradation above a particular limiting temperature.

Applicants have sought to provide an insulating material which is complementary to the above range of materials and which can be used as an alternative to such materials where reasons such as difficulties in manufacture and supply or specific unsatisfactory physical properties of the materials concerned leave an opening for an alternative.

In this regard applicants have found that an insulating material can be manufactured from formulations comprising mixtures of expanded perlite and bentonite.

The expanded perlite used in the compositions is derived from a perlite rock, a volcanic glass found in association with acid igneous lavas such as rhyolite. Generally speaking, it is compact, non-crystalline, grey-black or red in colour and normally contains up to 5% water of composition. The rock usually has a vitreous to waxy lustre and its structure ranges from massive to a friable composite of columnar needles. Concentric banding is common. Hardness on the Mohs scale is between 5.5 and 7 and the bulk density of crude perlite is in the region of 2250 kg/m$^3$.

When crushed and heated rapidly to temperatures in the range 750°–1200° C., the material expands to form expanded perlite, a material consisting of cellular masses with up to twenty times the volume of the original material.

The preferred perlite work material for the manufacture of insulation according to the invention is ore containing 3–4% water of composition crushed to pass 36 mesh BSS and expanded at a maximum temperature of 1000°–1200° C. The expanded material should preferably have a bulk density of 30–60 kg/m$^3$.

Bentonite is a montmorillonite-type clay with sodium as the principal exchangeable cation.

Chemically, montmorillonite is described as a hydrous aluminium silicate containing small amounts of alkali and alaline earth metals. Structurally, montmorillonite consists of two basic building blocks; the aluminium octahedral sheet and the silica tetrahedral sheet. A single montmorillonite unit cell consists of two silica tetrahedral sheets, between which is an aluminium octahedral sheet. The negative charge of the montmorillonite lattice is balanced by cations which can be readily exchanged. In naturally occurring montmorillonites, the exchangeable cations are usually sodium and calcium.

Bentonites have the property of forming thixotropic gels with water by adsorption on the basal surfaces with a corresponding increase in the c-axis dimension. This adsorbed water is lost on heating to 100°–200° C. but hydroxyl lattice water usually remains until the clay is heated to 700°–800° C., although some of the less well known forms of bentonite can lose lattice hydroxyl at temperatures in the region of 600° C. When the hydroxyl water is lost, bentonite will no longer adsorb water on the basal surfaces and loses its property to disperse in water.

Applicants have found that foamed insulating materials based on perlite-bentonite can often be used as an alternative to calcium silicate insulation. Moreover, the process components required for manufacturing the material can consist of entirely simple conventional equipment. A foam of the components can be produced chemically or mechanically without the use of high speed mixing equipment and the foamed slurry is simply shaped by conventional casting or pressing techniques, dried and fired. This compares favourably with processes for manufacturing calcium silicate which requires large capital outlays to cover the costs of steam generators and autoclaves.

Furthermore, unlike calcium silicates, applicant's material is not in a hydrated form and does not suffer degradation of required properties at operating temperatures. As a result, advantages of applicant's material over calcium silicate often include comparatively lower shrinkage and reduced liberation of dust during use. Applicant's process also has the advantage that it produces a "foamed foam" compared with a simple one stage foam produced by alternative techniques. The perlite used in the composition is itself expanded or foamed prior to incorporation and the composition is then foamed further to produce a mouldable gel having a "foamed foam" structure. There are obvious weight and insulating advantages to be gained once it is possible to produce such a "foamed foam" structure.

The products of the invention differ markedly from the conventional lightweight clay based materials such as those described in U.S. Pat. No. 3,689,611 which rely on the use of a foamed or expanded aggregate to give lightweight properties, but do not have a "foamed foam" structure. Such materials are generally formed by firing at high temperatures to give a ceramic bond. Thus the properties of the finished material differ markedly from the products of the invention which are characterised by a relatively low temperature firing which does not result in the formation of ceramic articles, but causes dehydroxylation of the clay, thereby preventing redispersion in water.

Applicant's process is made possible because of the unexpected properties of the foam during the drying step prior to firing. Generally, foams of this sort collapse on drying unless they include a setting agent or set of themselves, as does aerated concrete. Furthermore, the introduction of setting agents in many compositions can lead to undesirable operating properties such as unacceptable temperature expansion which leads to cracking. Unlike other foams, the foam of perlite and bentonite does not collapse during drying, even though it is not set and does not include a setting agent. As a result, the manufacturing process for applicant's insulating material is unexpectedly simple and inexpensive.

The invention provides a method of producing a high temperature insulating foam comprising forming with sufficient water to produce a gellable foam, a mixture of components in the following proportions expressed as percentages by weight of the components of the total composition, excluding water:

| Glass fibre | ½ to 20% |
|---|---|
| Expanded perlite | 40% to 95% |
| Bentonite | 5% to 40% | foaming the mixture, shaping the foamed mixture, drying the shaped foam and firing the dried foam at a temperature in excess of the temperature at which the bentonite lattice hydroxyl water is lost, but below 900° C., and preferably in the range 650° C. to 850° C.

In a preferred form of the invention the components of the mixture are present in the following proportions:

| Glass fibre | 1% to 5% |
|---|---|
| Expanded perlite | 70% to 85% |
| Bentonite | 10% to 30% |

The preferred glass fibre material is E glass fibre which, in the form of a lightly sized roving with a filament diameter of about 12 microns, chopped to lengths of 10–50 mm, has been found to be satisfactory for the process. The type of size does not appear to greatly affect either the mixing process or the product. Unsized fibre is also satisfactory.

As a major purpose of the glass fibre is to give the shaped foamed composition "green" strength prior to firing, the presence of glass fibre is in some cases not required thereafter, and in such cases it is possible to fire at temperatures above the softening point of the glass fibre. However, if the foam is destined for use where a high degree of flexural strength is required, the firing conditions for the foam may be modified to ensure that the firing temperature never exceeds the softening temperature of the glass fibre which is slightly above 700° C. In this way, it is possible to produce a fibre reinforced final product with all the physical advantages fibre reinforcement generally entails.

Surfactant preferably in quantities not exceeding 2% by weight of the total composition may also be included to improve foaming. The choice of surfactant used for the composition, if any, is not critical as practically any material or mixture of materials having the capacity of lowering the surface tension of water can be used. Examples of suitable surfactants are listed below:
Octa-decylamine ethoxylate
Alcohol ethoxylate
Nonyl-phenol ethoxylate
Coconut oil alkylolamide
Sodium fatty alcohol ethoxylate sulphate
Sodium nonyl-phenol ethoxylate sulphate
Sodium alkyl-ether sulphate
Sodium dodecyl-benzene sulphate
Sodium alkylnaphthalene sulphate
Sodium lauryl sulphate The invention will now be described in more detail with reference to the following three examples of formulations suitable for performance of the invention.

EXAMPLE I

The perlite required for this formulation is produced from −36 mesh BSS perlite ore expanded to give a product with a bulk density of 30–60 kg/m$^3$.

The bentonite required has sodium as its major replaceable cation. A bentonite found suitable for use has the following chemical composition.

| $SiO_2$ | 69.3% |
|---|---|
| $Al_2O_3$ | 12.2% |
| $Fe_2O_3$ | 3.1% |
| $TiO_2$ | 0.26% |
| $K_2O$ | 0.42% |
| $Na_2O$ | 3.1% |
| MgO | 2.7% |
| CaO | 2.6% |
| Loss on Ignition (1000° C.) | 6.07% |

Glass fibre used successfully in the laboratory preparation of the formulation is 60 end continuous roving K filament E-glass, chopped to 13 mm lengths. In large-scale batch preparation, the fibre length can be increased.

The surfactant used in this formulation is nonylphenol ethoxylate. The formulation is:

| Water | 66.67% | by weight |
|---|---|---|
| Perlite | 26.67% | by weight |
| Bentonite | 5.97% | by weight |
| Glass fibre | 0.67% | by weight |
| Surfactant | 0.02% | by weight |

EXAMPLE II

The high degree of variability in the characteristics of bentonites, and the range of particle sizes that can be produced by expanding perlite ore, require variation in the formulation to ensure a satisfactory product.

Wyoming (US) bentonites have a high capacity for adsorbing water but require a higher level of surfactant than some other bentonites to produce a material of the same density. By adjustment of the perlite, bentonite and surfactant levels, a product of similar properties can be produced:

| Water | 66.67% by weight |
|---|---|
| Perlite | 29.26% by weight |
| Wyoming Bentonite | 3.32% by weight |
| Glass fibre | 0.67% by weight |
| Surfactant | 0.08% by weight |

In this case the perlite, glass fibre and surfactant described in Example I are retained. The bentonite has the following chemical composition:

| $SiO_2$ | 62.0% |
|---|---|
| $Al_2O_3$ | 20.9% |
| $Fe_2O_3$ | 3.8% |
| $TiO_2$ | 0.15% |
| $K_2O$ | 0.47% |
| $Na_2O$ | 2.2% |
| MgO | 2.7% |
| CaO | 1.2% |
| Loss of Ignition (1000° C.) | 5.60% |

It is also possible to use combinations of bentonites in the formulation.

Variations in perlite grade can be accommodated in the formulation by similar adjustments to the bentonite/perlite ratio and surfactant level. Generally, perlite coarser than the preferred size requires a lower bentonite/perlite ratio, perlite finer than the preferred size requires a higher bentonite/perlite ratio.

Density control is achieved by variations in the surfactant level, provided the formulation and mixing process are held constant.

In a production situation, waste generated by the trimming of products can be crushed to pass 10 mesh BSS and used to partially replace the perlite component of the mix.

EXAMPLE III

In some applications, a relatively thin insulating board is required. Asbestos millboard is no longer used in many such applications because of the asbestos dust hazard. A modification to the formulation can be made to provide a suitable alternative to asbestos millboard. Using the preferred materials for Example I, an insulating board can be made using the following proportions of materials:

| Water | 66.67% | by weight |
|---|---|---|
| Perlite | 25.00% | by weight |
| Bentonite | 6.65% | by weight |
| Glass fibre | 1.67% | by weight |
| Surfactant | 0.01% | by weight |

The strength of the product can be increased by an increase in either the fibre level or fibre length used. In both cases there is some loss in casting properties.

The processing of the compositions disclosed in Examples I to III is carried out in five major steps:

|  | Step |
|---|---|
| WEIGHING | 1 |
| MIXING | 2 |
| CASTING OR PRESSING | 3 |
| DRYING | 4 |
| FIRING | 5 |

1. Weighing

The quantities of materials required for the batch are weighed and held separately. The perlite is weighed as two separate equal portions.

2. Mixing

Mixers suitable for the process include sigma blade, planetary, ribbon and paddle types. The planetary type mixer is preferred.

(a) Water and surfactant are placed in the mixer and mixing is commenced;

(b) Bentonite is added and the mixing is continued until the clay is dispersed;

(c) About half of the perlite is added and mixing is continued until a foamed slurry is produced;

(d) Glass fibre is added while mixing;

(e) The remaining perlite is added and mixing is continued until a foamed slurry is again produced.

As a variation to (a) the bentonite, water and surfactant may be pre-mixed and held until required. This procedure has the advantage of allowing the bentonite a longer time for water adsorption, and leads to better dispersion of binder in the product.

3. Casting or Pressing

Because of the high water level of the slurry, it is preferable to cast in porous moulds to provide a maximum surface area for drying. For block insulation, corrugated board boxes have been found to provide sufficient support for the wet slurry. Pipe sections and other shapes can be encased in suitably shaped moulds, or alternatively, machined from the block insulation product.

The slurry can be gravity fed into moulds, using a small degree of vibration to ensure the filling of corners and to avoid the entrainment of large air bubbles. Alternatively, the slurry can be injected into moulds under pressure. For thin sections such as boards up to 50 mm thick, metal trays can be used as moulds if de-moulding is carried out before the firing stage.

For casting, the slurry should have a consistency similar to whipped cream. Adjustments to the solids/water ratio can be made to achieve the correct casting properties—this is best done by a trial and observation technique.

As a variation of (e) mixing may be terminated anytime after the second portion of expanded perlite has been adequately dispersed. This procedure can provide a mix of suitable consistency for shaping by a conventional pressing process, thus avoiding the large mould inventory required if a casting process is used. By adjustment of the mixing time, the consistency of the final mix can be varied to suit the particular moulding conditions employed.

If the variation to part (e) of the mixing procedure is used, it is possible to press some shapes, such as rectangular blocks, which will retain their pressed dimensions after demoulding, provided they are supported on their lower surface by an inflexible material. Generally, a pressing load of 100–500 kPa is sufficient—higher loads lead to the formation of pressing laminations.

A pressing process found suitable for use in the production of rectangular blocks is:

(a) a mould, with a removable base of rigid flat sheet material, is charged with the mixture;

(b) a load is applied evenly over the upper surface for a period of about 5 seconds;

(c) the material and support sheet are ejected from the mould.

4. Drying

Drying is commenced at 80° C. or less, and the temperature is then gradually raised as a hard shell forms at the surface of the shape. The drying stage may continue without interruption to the firing stage, through a progressive increase in temperature, or it may be terminated when the material is essentially dry and can be transferred without damage to a furnace.

Drying times depend on the volume and geometry of the shape. As a guide, a block 300 mm × 300 mm × 300 mm can be considered dry after 72 hours at a continuous temperature of 80° C. in a corrugated board mould. Any remaining water is released during the firing stage.

The rate of temperature increase during the drying process and the terminal temperature are dependent upon the volume of the shape and the drying equipment being used. The material does not have a high drying sensitivity, but surface cracks can form if the slurry is not supported sufficiently well in the mould, and the expansion of entrained air produces a volume increase. This is particularly evident if the upper surface is not restrained during the early stages of the drying process.

Linear drying shrinkage is normally less than 0.1%, measured on a sample dimension of 300 mm.

5. Firing

The firing temperature must exceed the temperature at which the bentonite lattice hydroxyl water is lost, but preferably must not exceed the temperature at which the reinforcing fibre suffers excessive degradation. In general, the operating temperature range is 680°–720° C.

The shapes are fired for a sufficient time for the centre of the thickest portion to be at the firing temperature for two hours. If the material is completely dry before firing, it can be placed directly in a furnace operating at the firing temperature. Similarly, after the required firing time has elapsed, the material may be removed from the furnace to cool in an ambient temperature atmosphere without thermal shock damage.

If the product is required for an application in which the reinforcing properties of the fibre are not required, the firing temperature can be increased beyond the recommended temperature to 850° C. to 870° C. At these temperatures, a higher compressive strength is developed, but the material becomes more brittle.

Linear firing shrinkage within the recommended temperature range is less than 0.2%, measured on a sample dimension of 300 mm.

PROCESS FLOW CHART

Figure 1:
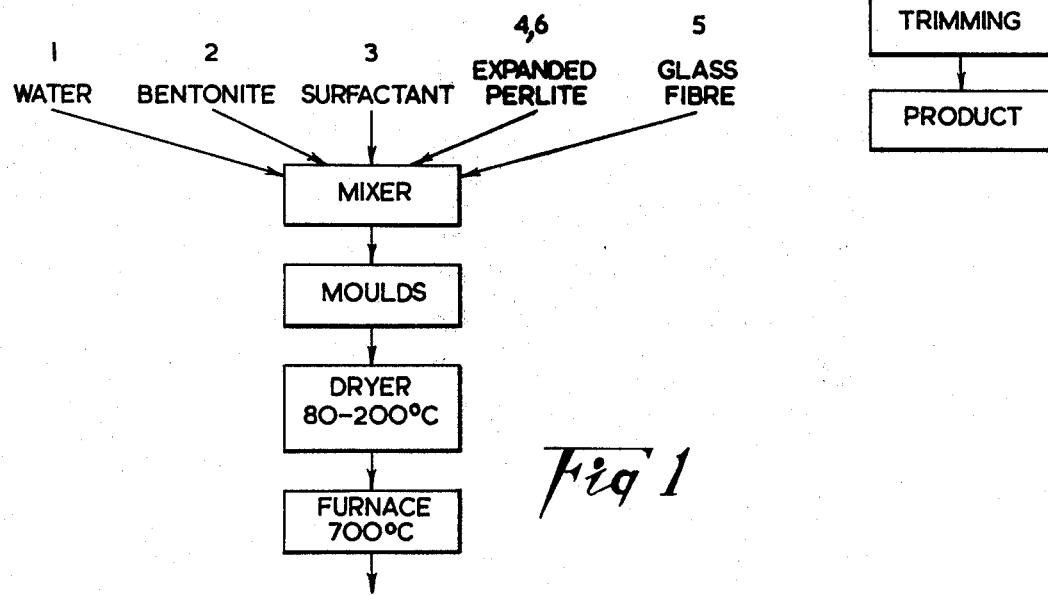

Flow sheet 1 shows the process in its simplest form (FIG. 1). Raw materials are numbered to indicate the order of introduction to the mixing vessel.

An alternative flow sheet 2 is shown hereunder. This is essentially the same as the previous flow sheet, but includes the refinements of a separate mixing process for the clay, and a holding tank to permit a continuous casting process.

PHYSICAL PROPERTIES

The physical properties of the product vary according to the type of raw materials used, the formulation and process variables. However, for material produced from the formulation of Example 1, the following properties have been measured:

| Density | 225 kg/m$^3$ |
| --- | --- |
| Modulus of rupture | 320 kPa |
| Compressive Strength | 280 kPa |
| Thermal Conductivity | 0.13 w/m.K at 500° C. |

With suitable variations to the formulation, a material can be produced within a density range of 95–500 kg/m$^3$. Generally, modulus of rupture, compressive strength and thermal conductivity each increase as the density increases, the preferred values for these properties falling within the ranges 150 to 1,000 kPa; 150 to 1,000 kPa and 0.1 to 0.2 w/m.K at 500° C., respectively.

Unlike calcium silicate, the product has a very low in-service shrinkage. Dimensional changes at temperatures up to 800° C. are almost negligible. At 900° C. however, shrinkage is considerable, and a realistic maximum service temperature for the product is about 850° C.

Whilst the foregoing Examples deal exclusively with the production of a foam by mechanical mixing, it is equally possible to use conventional chemical foamants to cause foaming and the manner of use of such foamants would be well within the purview of the person skilled in this art.

I claim:

1. A method of producing a high temperature insulating foam comprising forming with sufficient water to produce a gellable foam, a mixture of components in the following proportions, expressed as percentages by weight of the components of the total composition, excluding water:

| Glass fibre | 0.5 to 20% |
| --- | --- |
| Expanded perlite | 40% to 95% |
| Bentonite | 5% to 40% | foaming the mixture, shaping the foamed mixture, drying the shaped foam and firing the dried foam at a temperature lower than 900° C. and in excess of the temperature at which the bentonite lattice hydroxyl water is lost, said temperature being below the temperature at which a ceramic product is formed.

2. A method according to claim 1, wherein the components of the composition are present in the following weight proportions:

| Glass fibre | 1% to 5% |
| --- | --- |
| Expanded perlite | 70% to 85% |
| Bentonite | 10% to 30% |

3. A method according to claim 1, wherein the glass fibre is E glass fibre.

4. A method according to claim 1, wherein the firing temperature lies within the range of 650° C. to 850° C.

5. A method according to claim 4, wherein the firing temperature lies within the range 680° C. to 720° C.

6. A method according to claim 3, wherein the firing temperature is lower than the softening point of E glass fibre.

7. A method according to claim 1, wherein the composition includes a surfactant.

8. A method according to claim 7, wherein the surfactant does not exceed 2% by weight of the total composition, including water.

9. A method according to claim 1, wherein the composition is foamed by mechanical entrainment of air.

10. A method according to claim 1, wherein the dried foam is fired for a time sufficiently long as to allow all parts of the dried foam to be at the firing temperature for at least two hours.

11. A method according to claim 1, wherein the insulating foam has a density within the range 95 to 500 kg/m$^3$.

12. A method according to claim 1, wherein the insulating foam has a modulus of rupture falling within the range 150 to 1,000 kPa.

13. A method according to claim 1, wherein the insulating foam has a thermal conductivity in the range 0.1 to 0.2 w/m.K at 500° C.

* * * * *